(12) United States Patent
Hou et al.

(10) Patent No.: US 12,395,366 B2
(45) Date of Patent: Aug. 19, 2025

(54) TRAFFIC CHARGING METHOD, NETWORK DEVICE AND STORAGE MEDIUM

(71) Applicant: ZTE Corporation, Shenzhen (CN)

(72) Inventors: Lichang Hou, Shenzhen (CN); Hao Jiang, Shenzhen (CN); Yong Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 393 days.

(21) Appl. No.: 18/013,491

(22) PCT Filed: May 24, 2021

(86) PCT No.: PCT/CN2021/095558
§ 371 (c)(1),
(2) Date: Dec. 28, 2022

(87) PCT Pub. No.: WO2022/001482
PCT Pub. Date: Jan. 6, 2022

(65) Prior Publication Data
US 2023/0283492 A1 Sep. 7, 2023

(30) Foreign Application Priority Data
Jun. 29, 2020 (CN) .......................... 202010605976.7

(51) Int. Cl.
| | | |
|---|---|---|
| *H04L 12/14* | (2006.01) | |
| *H04M 15/00* | (2006.01) | |
| *H04W 4/24* | (2018.01) | |

(52) U.S. Cl.
CPC ........ *H04L 12/1432* (2013.01); *H04M 15/81* (2013.01); *H04W 4/24* (2013.01)

(58) Field of Classification Search
CPC ...... H04L 12/1432; H04M 15/81; H04W 4/24
See application file for complete search history.

(56) References Cited

U.S. PATENT DOCUMENTS

| | | |
|---|---|---|
| 6,408,174 B1 | 6/2002 | Steijer |
| 2020/0186977 A1* | 6/2020 | Xia ..................... H04L 12/1407 |

FOREIGN PATENT DOCUMENTS

| | | |
|---|---|---|
| CN | 102026134 A | 4/2011 |
| CN | 102291704 A | 12/2011 |

(Continued)

OTHER PUBLICATIONS

First Office Action for Chinese Application No. 202010605976.7, dated Aug. 23, 2024.

(Continued)

*Primary Examiner* — Myron Wyche
(74) *Attorney, Agent, or Firm* — Wolf, Greenfield & Sacks, P.C.

(57) ABSTRACT

A traffic charging method, a network device and a storage medium are disclosed. The method may include: establishing a session with a session management function network element, and receiving a usage amount reporting rule transmitted by the session management function network element, the usage amount reporting rule comprising a first reporting mode field and a reporting threshold, the first reporting mode field comprising delayed reporting; and in response to a rate switching event occurring when the user plane function network element forwards a packet, continuously forwarding the packet until the reporting threshold is reached, and transmitting usage amount information to the session management function network element, so that the session management function network element transmits a call ticket to a charging function network element according to the usage amount information.

11 Claims, 5 Drawing Sheets

(56) References Cited

FOREIGN PATENT DOCUMENTS

| | | | | | |
|---|---|---|---|---|---|
| CN | 10434299 | * | 2/2015 | .............. | H04W 4/26 |
| CN | 104349299 A | | 2/2015 | | |
| JP | 2010-098639 A | | 4/2010 | | |
| KR | 20200015303 A | | 2/2020 | | |

OTHER PUBLICATIONS

First Search Report for Chinese Application No. 202010605976.7, dated Aug. 19, 2024.
Zhang H. Q., Design and Implementation of Unicom Online Charging System. Xiamen Univ., China Master's Theses Database. May 16, 2014;8:137 pages.
Extended European Search Report for European Application No. 21832512.4, dated Aug. 17, 2023.
International Search Report and Written Opinion for International Application No. PCT/CN2021/095558 mailed Jul. 8, 2021.
[No Author Listed], Pseudo-CR on Monitoring Time and Time of Tariff Change. Nokia. Alcatel-Lucent Shanghai Bell. C4-172049. Apr. 7, 2017. 6 pages.
PCT/CN2021/095558, Jul. 8, 2021, International Search Report and Written Opinion.

* cited by examiner

TRAFFIC CHARGING METHOD, NETWORK DEVICE AND STORAGE MEDIUM

CROSS-REFERENCE TO RELATED APPLICATION

The present application is a national stage filing under 35 U.S.C. § 371 of international application number PCT/CN2021/095558, filed on May 24, 2021, which claims priority to Chinese Patent Application No. 202010605976.7 filed on Jun. 29, 2020. The entire contents of these applications are incorporated herein by reference.

TECHNICAL FIELD

The present disclosure relates to the technical field of communication, and in particular to a traffic charging method, a network device and a storage medium.

BACKGROUND

In the CU separation (i.e., separation of control plane and user plane) concept proposed in the introduction of the 5G network architecture into the 3rd Generation Partnership Project (3GPP), the evolved packet core (EPC) is split into a control plane and a user plane. For example, the control plane includes a session management function (SMF) network element, a charging function (CHF) network element, etc., and the user plane includes a user plane function (UPF) network element, etc. At present, in a charging system composed of the charging function network element, the session management function network element and the user plane function network element, if a rate switching event occurs during traffic charging, the usage amount information and/or session information of the session management function network element may increase dramatically due to the rate switching, resulting in a dramatic increase in the signaling load of the session management function network element.

SUMMARY

On this basis, the embodiments of the present disclosure provide a traffic charging method, a network device and a storage medium.

In accordance with an aspect of the present disclosure, an embodiment provides a traffic charging method, applied to a user plane function network element in a network device. The method includes steps of: establishing a session with a session management function network element, and receiving a usage amount reporting rule transmitted by the session management function network element, the usage amount reporting rule including a first reporting mode field and a reporting threshold, the first reporting mode field including delayed reporting; and, in response to a rate switching event occurring when the user plane function network element forwards a packet, continuously forwarding the packet until the reporting threshold is reached, and transmitting usage amount information to the session management function network element, so that the session management function network element transmits a call ticket to a charging function network element according to the usage amount information.

In addition, an embodiment of the present disclosure further provides a traffic charging method, applied to a session management function network element in a network device. The method includes steps of: establishing a session with a user plane function network element, and transmitting a usage amount reporting rule to the user plane function network element, the usage amount reporting rule including a first reporting mode field and a reporting threshold, the first reporting mode field including delayed reporting; in response to a rate switching event occurring when the user plane function network element forwards a packet, receiving usage amount information transmitted by the user plane function network element according to the reporting threshold; and, transmitting a call ticket to a charging function network element according to the usage amount information.

In accordance with another aspect of the present disclosure, a network device is provided, including a processor and a memory, where the memory is configured to store computer programs; and, the processor is configured to execute the computer programs to implement the traffic charging method described in the above aspect.

In accordance with another aspect of the present disclosure, a computer-readable storage medium is provided, where the computer-readable storage medium stores computer programs which, when executed by a processor, cause the processor to implement the traffic charging method described in the above aspect.

DETAILED DESCRIPTION

The technical schemes in the embodiments of the present disclosure will be described below in conjunction with the drawings in the embodiments of the present disclosure. Apparently, the embodiments to be described herein are only some but not all of the embodiments of the present disclosure. All other embodiments obtained by a person having ordinary skill in the art without paying any creative effort on the basis of the embodiments in this description shall fall into the protection scope of the present disclosure.

The flowcharts shown in the drawings are merely illustrative, and do not necessarily include all the contents and operations/steps and are not necessarily executed in the order described. For example, some operations/steps may be subdivided, combined or partially combined, so the actual execution order may vary according to the actual situation.

Some implementations of the present disclosure will be described below in detail in conjunction with the drawings. The following embodiments and the features in the embodiments may be combined to derive other embodiments not explicitly described.

Before the discussion of the traffic charging method provided in the embodiments of the present disclosure, the 5G communication network architecture shown in FIG. 1 will be discussed briefly. The network architecture includes: an access management function (AMF) network element, a session management function (SMF) network element, a charging function (CHF) network element, a user plane function (UPF) network element, an access network (AN), a data network (DN), etc., The access network may be a radio AN (RAN), or a wired AN, so the access network may be denoted by (R)AN. In some implementations, the SMF network element is connected to the CHF network element through an N40 interface, and the SMF network element is connected to the UPF network element through an N4 interface. Other connections are shown in FIG. 1 and will not be discussed here.

Figure 1:
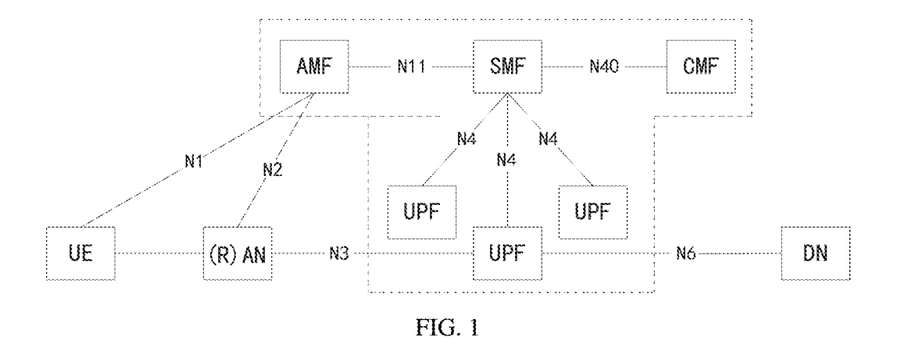
FIG. 1 is a schematic diagram of a 5G communication network architecture.

The network architecture includes a 5G core network which includes network elements in the dashed box in FIG. 1. The 5G core network may be divided into a control plane and a user plane. For example, the control plane includes an AMF network element, an SMF network element and a CHF network element, and the user plane includes a UPF network element. In some implementations, the SMF network element, the CHF network element and the UPF network element may form a charging system for charging the traffic of the online behavior of the user equipment (UE). It should be understood that the 5G core network may be arranged on a network device.

In some implementations, the SMF network element first establishes a session with the CHF network element and obtains charging information from the CHF network element, so that the SMF network element can configure a usage amount reporting rule according to the charging information, for example, a reporting threshold in the usage amount reporting rule. Then, the SMF network element establishes a session with the UPF network element and transmits the usage amount reporting rule to the UPF network element. The reporting threshold includes a traffic threshold or a time threshold. On this basis, the UPF network element may forward a packet, for example, to a public data network (PDN), and may count the usage amount information of the UE during the packet forwarding process. If the reporting threshold is reached, the UPF network element transmits the current usage amount information to the SMF network element. The SMF network element generates a call ticket according to the usage amount information and transmits the call ticket to the CHF network element. Then, the CHF network element performs charging. It is to be noted that one SMF network element may be connected to a plurality of UPF network elements to perform traffic charging on a plurality of UEs, simultaneously. For example, the SMF network element in FIG. 1 is connected to three UPF network elements.

In some cases in this field, in a case where the SMF network element is connected to a plurality of UPF network elements and performs traffic charging, respectively, if a plurality of rate switching events occur at a same time point, the plurality of UPF network elements may simultaneously transmit the usage amount information before rate switching to the SMF network element, so that the usage amount information of the SMF network element is increased dramatically. In addition, when a rate switching event occurs, in order to enable the plurality of UPF network elements to count the usage amount according to the new usage amount counting rule, the SMF network element has to update the session with the CHF network element, so that the session information of the SMF network element is increased dramatically. Therefore, in the above case, the signaling load of the SMF network element may be increased dramatically.

Figure 2:
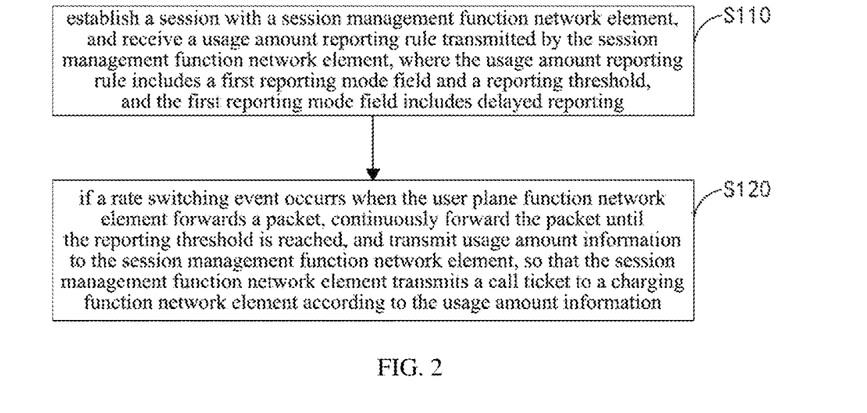
FIG. 2 is a flowchart of applying the method in the embodiments of the present disclosure to a user plane function network element in a network device.

On this basis, the traffic charging method provided in the embodiments of the present disclosure may be applied to a UPF network element in a network device. As shown in FIG. 2, the method includes, but not limited to, steps S110 and S120.

At step S110, a session is established with a SMF network element, and a usage amount reporting rule transmitted by the SMF network element is received. The usage amount reporting rule includes a first reporting mode field and a reporting threshold, and the first reporting mode field includes delayed reporting.

At step S120, if a rate switching event occurs when the UPF network element forwards a packet, the packet is continuously forwarded until the reporting threshold is reached, and the usage amount information is transmitted to the SMF network element, so that the SMF network element transmits a call ticket to a CHF network element according to the usage amount information.

In some implementations, in order to realize traffic charging, the SMF network element first establishes a session with the CHF network element to obtain charging information from the CHF network element. The charging information includes a charging reporting mode and a reporting threshold. The reporting threshold includes a traffic threshold, additionally or alternatively includes a time threshold, and the charging reporting mode includes immediate reporting or delayed reporting. If the charging reporting mode includes immediate reporting, the SMF network element needs to report the call ticket immediately if a rate switchover occurs in the subsequent process; and, if the charging reporting mode includes delayed reporting, the SMF network element does not need report the call ticket immediately if a rate switchover occurs in the subsequent process.

After the SMF network element establishes a session with the CHF network element, the SMF network element configures a usage amount reporting rule according to the charging information, for example, a reporting threshold in the usage amount reporting rule. In addition, a first reporting mode field may be set in the usage amount reporting rule. If the charging reporting mode is delayed reporting, the first reporting mode field may be set as delayed reporting; and, if the charging reporting mode is immediate reporting, the first reporting mode field may be set as immediate reporting. Then, the SMF network element establishes a session with the UPF network element, and transmits the usage amount reporting rule to the UPF network element. Thus, the UPF network element may forward a packet, for example, to a public data network.

In some implementations, the rate switching event may occur due to a time change, a quality of service (QOS) change, a data network change, an operator change, etc. In a case where the SMF network element is connected to a plurality of UPF network elements and performs traffic charging, respectively, if a plurality of rate switching events occur at a same time point, the usage amount information or session information of the SMF network element will not be increased dramatically according to the first reporting mode field, so that the signaling load of the SMF network element will not be increased dramatically.

In some implementations, when the SMF network element transmits the call ticket to the CHF network element, the current traffic charging is finished. If a next traffic charging needs to be performed, the embodiment of the present disclosure may be applied again.

In some embodiments, the usage amount reporting rule includes a rate switching time point. On this basis, the step S120 in this method may include, but is not limited to, steps S121 and S122.

At step S121, if it is detected that the current moment has reached the rate switching time point when the UPF network element forwards a packet, usage amount information before rate switching is generated, and the usage amount information before rate switching is cached according to the first reporting mode field. The packet is continuously forwarded until the reporting threshold is reached, and usage amount information after rate switching is generated.

At step S122, both the usage amount information before rate switching and the usage amount information after rate switching are transmitted to the SMF network element.

In some implementations, if a rate switching event may occur due to a time change during this traffic charging, the usage amount reporting rule during this traffic charging may include a rate switching time point. In addition, such rate switching event may be detected by the UPF network element. If such rate switching event occurs, the UPF network element may actively report the usage amount information.

Figure 3:
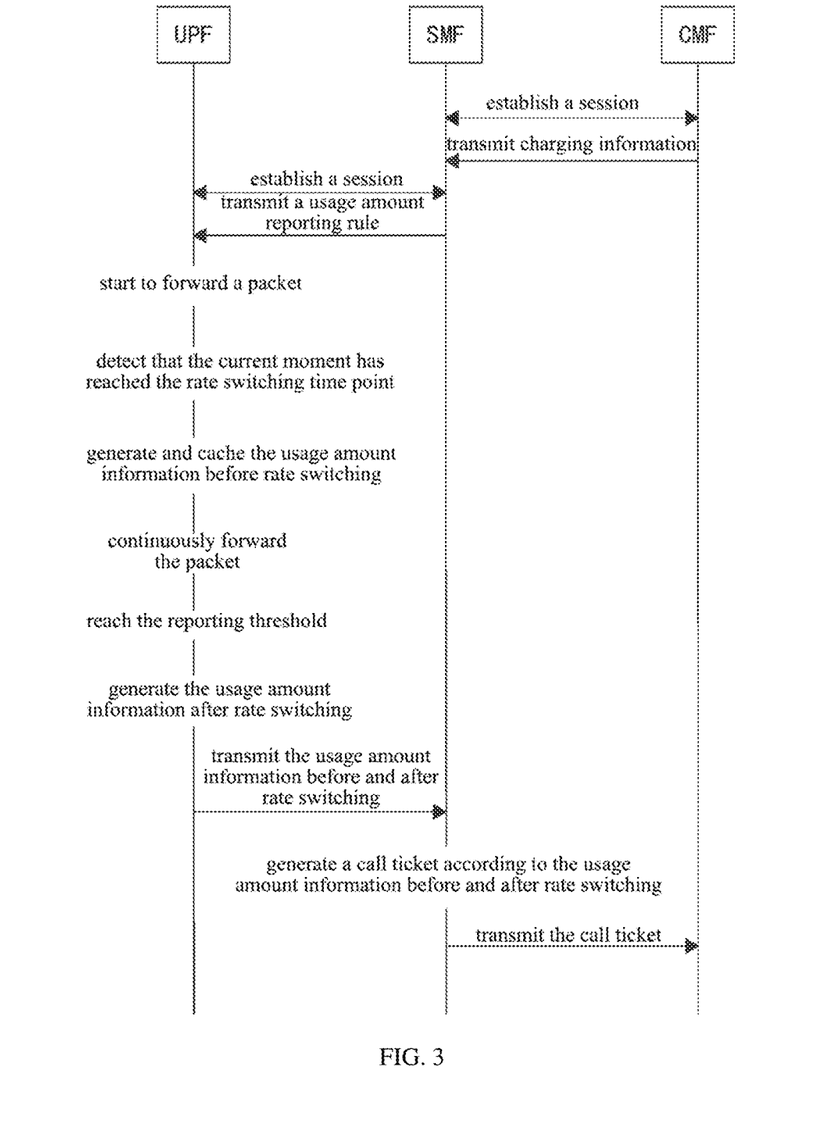
FIG. 3 is an interaction diagram of the occurrence of a rate switching event according to an embodiment of the present disclosure.

In some implementations, with reference to FIG. 3, after the SMF network element establishes a session with the CHF network element and the UPF network element successively, the UPF network element may start to forward a packet, for example, to a public data network. If it is detected that the current moment has reached the rate switching time point when the UPF forwards a packet, for example, the current moment has reached 23:00, the usage amount information before rate switching is generated. In addition, because the first reporting mode field is delayed reporting, the usage amount information before rate switching is cached, that is, the transmission of the usage amount information before rate switching to the SMF network element is delayed. Then, the UPF network element continuously forwards the packet until the reporting threshold is reached, for example, until the time threshold is reached. At this time, the UPF network element generates the usage amount information after rate switching. Thus, the UPF network element may transmit both the cached usage amount information before rate switching and the usage amount information after rate switching to the SMF network element, and the SMF network element may in turn generate a call ticket according to the usage information before and after rate switching and transmit the call ticket to the CHF network element, so that this charging is ended. If a next traffic charging needs to be performed, the embodiment in the present disclosure may be applied again.

It should be understood that, in a case where the SMF network element is connected to a plurality of UPF network elements and performs traffic charging, respectively, if a plurality of the above-described rate switching events occur at a same time point, the plurality of UPF network elements may cache the usage amount information before rate switching, that is, they may delay the transmission of the usage amount information before rate switching. Therefore, the SMF network element will not receive a large amount of the usage amount information at this time point, so that the usage amount information of the SMF network element will not be increased dramatically. That is, the signaling load of the SMF network element will not be increased dramatically.

In some embodiments, the usage amount reporting rule includes a QoS change identifier. On this basis, the step S120 in this method may include, but is not limited to, steps S123 and S124.

At step S123, if a QoS change is detected when the UPF network element forwards a packet, the usage amount information before rate switching is generated, and the usage amount information before rate switching is cached according to the first reporting mode field. The packet is continuously forwarded until the reporting threshold is reached, and the usage amount information after rate switching is generated.

At step S124, both the usage amount information before rate switching and the usage amount information after rate switching are transmitted to the SMF network element.

In some embodiments, after a QoS change is detected, the step S123 may further include, but is not limited to, the following steps.

A QOS execution rule transmitted by the SMF network element is received. A current QoS parameter is updated according to the QoS execution rule.

In some implementations, if a rate switching event may occur due to a QoS change during this traffic charging, it is possible to carry a QoS change identifier by the usage amount reporting rule for this traffic charging, or it is possible to set a field in the usage amount reporting rule and then set this field as a QoS change identifier. In addition, such a rate switching event may be detected by the UPF network element. Thus, if such rate switching event occurs, the UPF network element may actively report the usage amount information according to the QoS change identifier.

Figure 4:
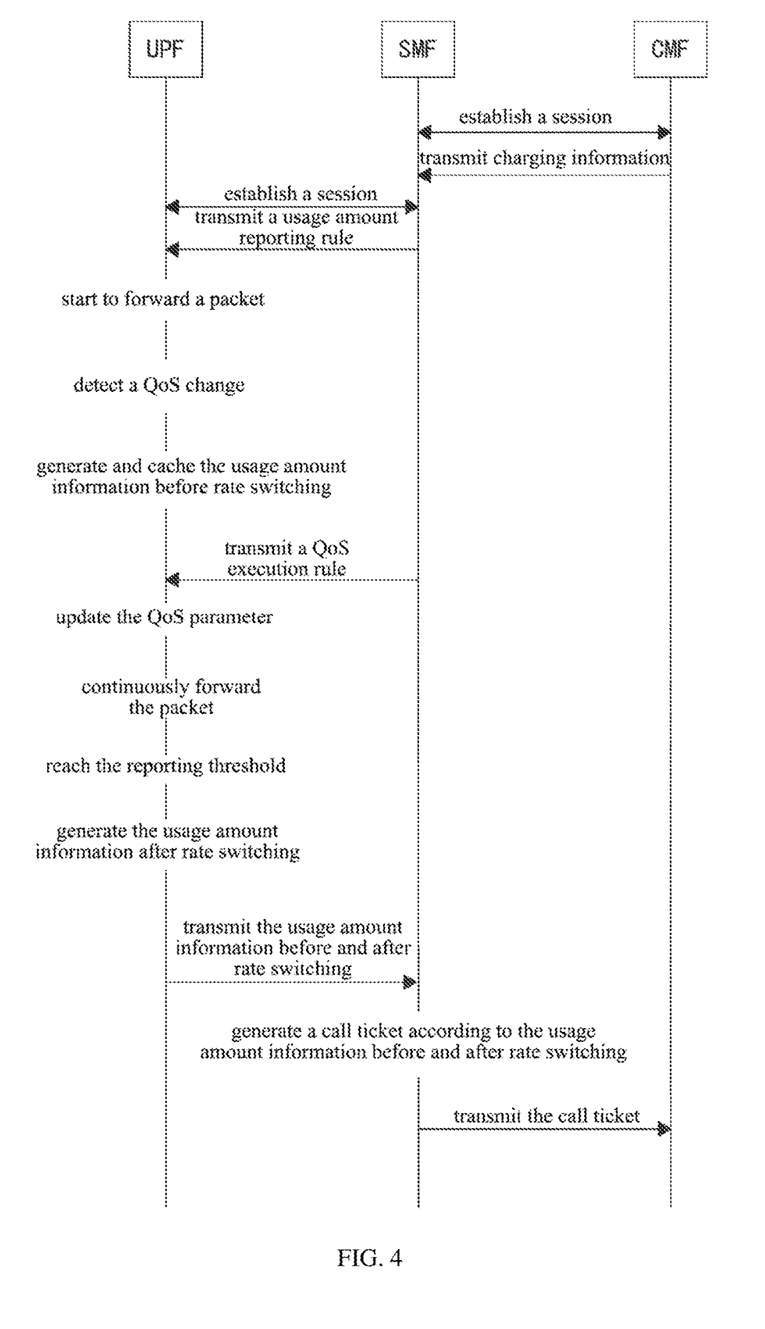
FIG. 4 is another interaction diagram of the occurrence of a rate switching event according to another embodiment of the present disclosure.

In some implementations, with reference to FIG. 4, after the SMF network element establishes a session with the CHF network element and the UPF network element successively, the UPF network element may start to forward a packet, for example, to a public data network. If a QoS change is detected when the UPF network element forwards a packet, the usage amount information before rate switching is generated. Because the first reporting mode field is delayed reporting, the usage amount information before rate switching is cached, that is, the transmission of the usage amount information before rate switching to the SMF network element is delayed. Then, the UPF network element continuously forwards the packet until the reporting threshold is reached, for example, until the time threshold is reached. At this time, the UPF network element generates the usage amount information after rate switching. In addition, when a QoS change is detected, the SMF network element may update the session with the UPF network element and transmit a QoS execution rule, so that the UPF network element may update a current QoS parameter according to the QoS execution rule and provide a corresponding service to the terminal user. Thus, the UPF network element may transmit both the cached usage amount information before rate switching and the usage amount information after rate switching to the SMF network element according to the QoS change identifier, and the SMF network element may generate a call ticket according to the usage information before and after rate switching and transmit the call ticket to the CHF network element, so that this charging is ended. If a next traffic charging needs to be performed, the embodiment in the present disclosure may be applied again.

It should be understood that, in a case where the SMF network element is connected to a plurality of UPF network elements and performs traffic charging, respectively, if a plurality of the above-described rate switching events occur at a same time point, the plurality of UPF network elements may cache the usage amount information before rate switching, that is, they may delay the transmission of the usage amount information before rate switching. Therefore, the SMF network element will not receive a large amount of the usage amount information at this time point, so that the usage amount information of the SMF network element will not be increased dramatically. That is, the signaling load of the SMF network element will not be increased dramatically.

In some embodiments, if a rate switching event is triggered when the SMF network element detects a data network change or an operator change, the step 120 in this method may include, but is not limited to, steps S125 to S127.

At step S125, if a rate switching event occurs when the UPF network element forwards a packet, a query usage amount reporting rule transmitted by the SMF network element is received. The query usage amount reporting rule includes a second reporting mode field which includes delayed reporting.

At step S126, the session with the SMF network element is updated, and the usage amount information before rate switching is generated and transmitted to the SMF network element, so that the SMF network element caches the usage amount information before rate switching.

At step S127, the packet is continuously forwarded until the reporting threshold is reached, and the usage amount information after rate switching is generated and transmitted to the SMF network element.

In some implementations, a rate switching event may occur due to the data network change or the operator change during this traffic charging, and such rate switching event may be detected by the SMF network element.

Figure 5:
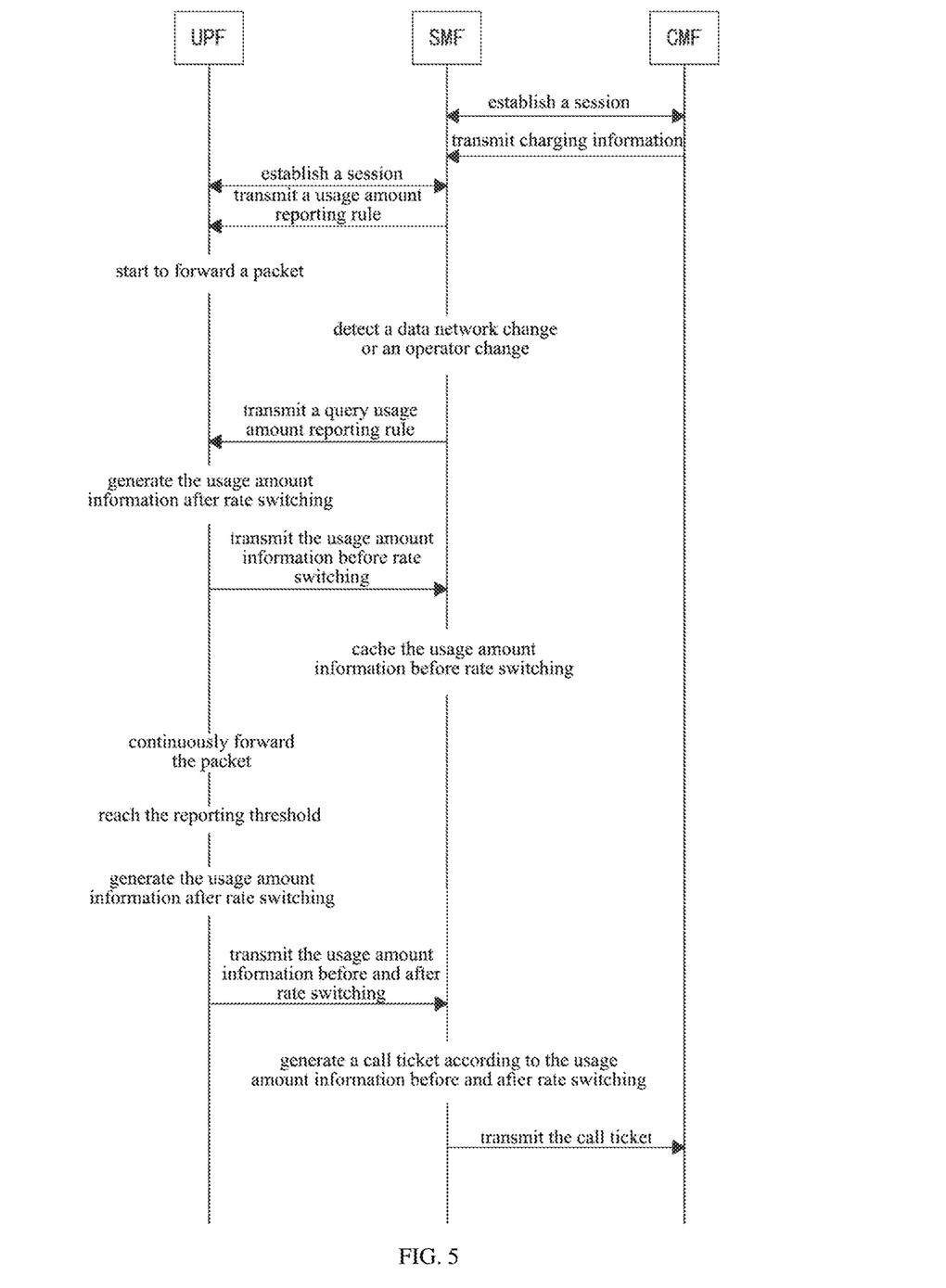
FIG. 5 is another interaction diagram of the occurrence of a rate switching event according to another embodiment of the present disclosure.

In some implementations, as shown in FIG. 5, after the SMF network element establishes a session with the CHF network element and the UPF network element successively, the UPF network element may start to forward a packet, for example, to a public data network. If the SMF network element detects a data network change or an operator change when the UPF network element forwards a packet, the SMF network element updates the session with the UPF network element and transmits a query usage amount reporting rule in which a second reporting mode field is set, and the second reporting mode field is delayed reporting. Thus, the reporting mode field in the usage amount reporting rule in the UPF network element will not be changed after the session is updated. After the session is updated, the UPF network element generates the usage amount information before rate switching and transmits the usage amount information before rate switching to the SMF network element, and the SMF network element caches the usage amount information before rate switching. Then, because the second reporting mode field is delayed reporting, the UPF network element can continuously forward the packet until the reporting threshold is reached, generate the usage amount information after rate switching and transmit the usage amount information after rate switching to the SMF network element. It is to be noted that, if the reporting mode field does not exist, the SMF network element needs to update or reestablish the session with the CHF network element to obtain a new reporting threshold and configure a usage amount reporting rule, and reports the usage amount reporting rule to the UPF network element, so that the UPF network element may start to count the usage amount information again. Upon receiving the usage amount information after rate switching, the SMF network element may generate a call ticket according to both the cached usage amount information before rate switching and the usage amount information after rate switching, and then transmit the call ticket to the CHF network element, so that this charging is ended. If a next traffic charging needs to be performed, the embodiment in the present disclosure may be applied again.

It should be understood that, in a case where the SMF network element is connected to a plurality of UPF network elements and performs traffic charging, respectively, if a plurality of rate switching events occur at a same time point, the plurality of UPF network elements transmit the usage amount information before rate switching to the SMF network element, and the SMF network element caches the usage amount information before rate switching. At this time, because the current reporting mode field in these UPF network elements is still delayed reporting, these UPF network elements may continuously forward the packet within the current reporting threshold without updating the session between the SMF network element and the CHF network element. Thus, the session information of the SMF network element will not be increased dramatically, that is, the signaling load of the SMF network element will not be increased dramatically.

An embodiment of the present disclosure further provides a traffic charging method, applied to a SMF network element in a network device. This method includes, but is not limited to, steps S210 to S230.

At step S210, a session is established with a UPF network element, and a usage amount reporting rule is transmitted to the UPF network element. The usage amount reporting rule includes a first reporting mode field and a reporting threshold, and the first reporting mode field includes delayed reporting.

At step S220, if a rate switching event occurs when the UPF network element forwards a packet, the usage amount information transmitted by the UPF network element according to the reporting threshold is received.

At step S230, a call ticket is transmitted to a CHF network element according to the usage amount information.

In some embodiments, the step S220 in this method includes, but is not limited to, steps S221 and S222.

At step S221, if a data network change or an operator change is detected when the UPF network element forwards a packet, a query usage amount reporting rule is transmitted to the UPF network element, and the session with the UPF network element is updated to receive and cache the usage amount information before rate switching transmitted by the UPF network element. The query usage amount reporting rule includes a second reporting mode field, and the reporting mode field including delayed reporting.

At step S222, the usage amount information after rate switching transmitted by the UPF network element is continuously received. The usage amount information after rate switching is generated when the UPF network element continuously forwards the packet and the reporting threshold is reached.

In some embodiments, the usage amount reporting rule includes a rate switching time point or a QoS change identifier. The rate switching event occurs when the UPF network element detects that the current moment has reached the rate switching time point, or is triggered when the UPF network element detects a QoS change. On this basis, the step S220 in this method includes, but is not limited to, the following steps.

Both the usage amount information before rate switching and the usage amount information after rate switching transmitted by the UPF network element are received.

It is to be noted that, for the method applied to the SMF network element in the embodiments of the present disclosure, the specific implementations have been discussed above and will not be repeated here.

Figure 6:
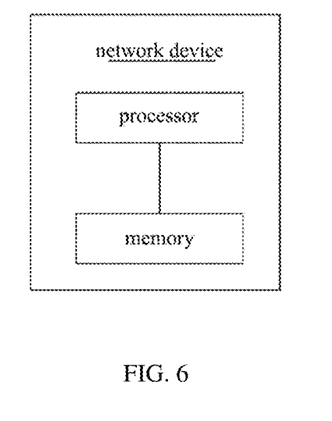
FIG. 6 is a schematic structure diagram of a network device according to an embodiment of the present disclosure.

An embodiment of the present disclosure further provides a network device, as shown in FIG. 6, including a processor and a memory, where the memory is configured to store computer programs, and the processor is configured to execute the computer programs and implement the traffic charging method provided in any one of the embodiments of the present disclosure when executing the computer programs.

It should be understood that the processor may be a central processing unit (CPU). Alternatively, the processor may also be other general purpose processors, digital signal processors (DSPs), application specific integrated circuits (ASICs), field-programmable gate arrays (FPGAs) or other programmable logic devices, discrete gate or transistor logic devices, discrete hardware components, etc. The general purpose processor may be a microprocessor. Alternatively, the processor may also be any conventional processor, etc.

An embodiment of the present disclosure further provides a computer-readable storage medium storing computer programs which, when executed by a processor, cause the processor to implement the traffic charging method provided in any one of the embodiments of the present disclosure.

In accordance with the traffic charging method, the network device and the storage medium provided in the embodiments of the present disclosure, the method includes steps of: establishing, by a user management function network element, a session with a session management function network element, and receiving a usage amount reporting rule, the usage amount reporting rule including a first reporting mode field and a reporting threshold, the field including delayed reporting; and, if a rate switching event occurs when the user management function network element forwards a packet, continuously forwarding the packet until the reporting threshold is reached, and transmitting usage amount information to the session management function network element, so that the session management function network element transmits a call ticket to a charging function network element according to the usage amount information. It should be understood that, in a case where the session management function network element is connected to a plurality of user plane function network element and performs traffic charging, respectively, if a rate switching event occurs, the usage information or session information of the session management function network element will not be increased dramatically according to the first reporting mode field, so that the signaling load of the SMF network element will not be increased dramatically.

It should be understood by those having ordinary skill in the art that, all or some of the steps in the methods described above and the functional modules/units in the systems and apparatuses described above may be implemented as software, firmware, hardware and suitable combinations thereof. In the hardware implementation, the division of the functional modules/units mentioned above does not necessarily correspond to the division of physical components. For example, one physical component may have a plurality of functions, or one function or step may be cooperatively executed by a number of physical components. Some or all of the physical components may be implemented as software executed by processors such as central processors, digital signal processors or microprocessors, or implemented as hardware, or implemented as integrated circuits such as application-specific integrated circuits. Such software may be distributed on computer-readable mediums, and the computer-readable mediums may include computer storage mediums (or non-transitory mediums) and communication mediums (or transitory mediums).

As well-known to a person having ordinary skill in the art, the term computer-readable storage medium includes volatile or non-volatile and removable or non-removable mediums implemented in any method or technology used to store information (such as computer-readable instructions, data structures, program modules or other data). The computer-readable storage medium may include, but not limited to, RAM, ROM, EEPROM, flash memory and other memory technologies, CD-ROM, digital versatile disk (DVD) or other optical disk storage, magnetic cassette, magnetic tape, magnetic disk storage or other magnetic storage device, or any other mediums that can be used to store desired information and can be accessed by computers. In addition, as well-known to a person having ordinary skill in the art, the communication medium generally contains computer-readable instructions, data structures, program modules or other data in modulation data signals such as carriers or other transmission mechanisms, and may include any information transfer medium.

In some embodiments, the computer-readable storage medium may be an internal memory unit in the network device described in the above embodiments, e.g., a hard disk or memory of the network device. The computer-readable storage medium may also be an external storage device of the network device, e.g., plug-in type hard disk, smart media card (SMC), secure digital (SD) card, flash card, etc. equipped on the network device.

The foregoing description merely shows specific implementations of the present disclosure, and the protection scope of the present disclosure is not limited thereto. Any person having ordinary skill in the art can easily conceive of various equivalent modifications or replacements within the technical scope disclosed by the present disclosure, and these modifications or replacements shall fall into the protection scope of the present disclosure. Therefore, the protection scope of the present disclosure shall be subject to the protection scope defined by the claims.

What is claimed is:

1. A traffic charging method, applied to a user plane function network element in a network device, comprising:
    establishing a session with a session management function network element, and receiving a usage amount reporting rule transmitted by the session management function network element, the usage amount reporting rule comprising a first reporting mode field and a reporting threshold, the first reporting mode field comprising delayed reporting, wherein the usage reporting rule comprises at least one of a quality of service change identifier and a rate switching time point;
    forwarding at least one packet;
    in response to detecting that a current moment has reached the rate switching time point when the user plane function network element forwards a packet, generating usage amount information before rate switching, and caching the usage amount information before rate switching according to the first reporting mode field;
    in response to detecting a quality of service change according to the quality of service change identifier when the user plane function network element forwards the packet, generating usage amount information before rate switching, and caching the usage amount information before rate switching according to the first reporting mode field;
    continuously forwarding at least one packet;
    in response to the usage amount information reaching the reporting threshold, transmitting both the usage amount information before rate switching and the usage amount information after rate switching to the session management function network element, so that the session management function network element transmits a call ticket to a charging function network element according to the usage amount information;

wherein the usage reporting rule allows the user plane function network element to record the usage amount information before rate switching and after rate switching separately according to the first reporting mode field.

2. The method of claim 1, further comprising:
in response to receiving a quality of service execution rule transmitted by the session management function network element, updating a current quality of service parameter according to the quality of service execution rule.

3. The method of claim 1, wherein when the session management function network element detect s a data network change or an operator change to trigger the rate switching event, the user plane function network element continuously forwards at least one packet, until the reporting threshold is reached, and transmitting usage amount information to the session management function network element comprises:

receiving a query usage amount reporting rule transmitted by the session management function network element, the query usage amount reporting rule comprising a second reporting mode field which comprises delayed reporting;

updating the session with the session management function network element, generating usage amount information before rate switching, and transmitting the usage amount information before rate switching to the session management function network element, so that the session management function network element caches the usage amount information before rate switching; and continuously forwarding at least one packet until the reporting threshold is reached, generating usage amount information after rate switching, and transmitting the usage amount information after rate switching to the session management function network element.

4. A traffic charging method, applied to a session management function network element in a network device, comprising:

establishing a session with a user plane function network element;

transmitting a usage amount reporting rule to the user plane function network element, the usage amount reporting rule comprising a first reporting mode field and a reporting threshold, the first reporting mode field comprising delayed reporting, so that the user plane function network element records the usage amount information before rate switching and after rate switching separately according to the first reporting mode field;

in response to a rate switching event occurring when the user plane function network element forwards a packet, receiving usage amount information transmitted by the user plane function network element according to the reporting threshold, and both the usage information before rate switching and the usage information after rate switching transmitted by the user plane function network element; and transmitting a call ticket to a charging function network element according to the usage amount information;

wherein the usage amount reporting rule comprises a rate switching time point or a quality of service change identifier, and wherein the rate switching event occurs in response to the user plane function network element detecting that the current moment has reached the rate switching time point, or is triggered in response to the user plane function network detecting a quality of service change.

5. The method of claim 4, wherein the in response to a rate switching event occurring when the user plane function network element forwards a packet, receiving usage amount information transmitted by the user plane function network element according to the reporting threshold comprises:

in response to detecting a data network change or an operator change when the user plane function network element forwards a packet, transmitting a query usage amount reporting rule to the user plane function network element, and updating the session with the user plane function network element to receive and cache the usage amount information before rate switching transmitted by the user plane function network element, the query usage amount reporting rule comprising a second reporting mode field which comprises delayed reporting; and continuously receiving the usage amount information after rate switching transmitted by the user plane function network element, the usage amount information after rate switching being generated when the user plane function network element continuously forwards the packet and the reporting threshold is reached.

6. A network device, comprising a processor, a memory, and a computer program stored in the memory and executable by the processor, wherein the data computer program, when executed by the processor, causes the processor to perform a traffic charging method comprising:

establishing a session with a session management function network element, and receiving a usage amount reporting rule transmitted by the session management function network element, the usage amount reporting rule comprising a first reporting mode field and a reporting threshold, the first reporting mode field comprising delayed reporting, wherein the usage reporting rule comprises at least one of a quality of service change identifier and a rate switching time point;

forwarding at least one packet;

in response to detecting that a current moment has reached the rate switching time point when the user plane function network element forwards a packet, generating usage amount information before rate switching, and caching the usage amount information before rate switching according to the first reporting mode field;

in response to detecting a quality of service change according to the quality of service change identifier when the user plane function network element forwards the packet, generating usage amount information before rate switching, and caching the usage amount information before rate switching according to the first reporting mode field;

continuously forwarding at least one packet;

in response to the usage amount information reaching the reporting threshold, transmitting both the usage amount information before rate switching and the usage amount information after rate switching to the session management function network element, so that the session management function network element transmits a call ticket to a charging function network element according to the usage amount information;

wherein the usage reporting rule allows the user plane function network element to record the usage amount information before rate switching and after rate switching separately according to the first reporting mode field.

7. A non-transitory computer-readable storage medium storing computer programs which, when executed by a processor, cause the processor to perform the traffic charging method of claim 1.

8. The network device of claim 6, wherein when the session management function network element detect s a data network change or an operator change to trigger the rate switching event, the user plane function network element continuously forwards at least one packet, until the reporting threshold is reached, and transmitting usage amount information to the session management function network element comprises:

receiving a query usage amount reporting rule transmitted by the session management function network element, the query usage amount reporting rule comprising a second reporting mode field which comprises delayed reporting;

updating the session with the session management function network element, generating usage amount information before rate switching, and transmitting the usage amount information before rate switching to the session management function network element, so that the session management function network element caches the usage amount information before rate switching; and continuously forwarding at least one packet until the reporting threshold is reached, generating usage amount information after rate switching, and transmitting the usage amount information after rate switching to the session management function network element.

9. A network device, comprising a processor, a memory, and a computer program stored in the memory and executable by the processor, wherein the data processing program, when executed by the processor, causes the processor to perform the traffic charging method of claim 4.

10. The non-transitory computer-readable storage medium of claim 7, wherein when the session management function network element detect s a data network change or an operator change to trigger the rate switching event, the user plane function network element continuously forwards at least one packet, until the reporting threshold is reached, and transmitting usage amount information to the session management function network element comprises:

receiving a query usage amount reporting rule transmitted by the session management function network element, the query usage amount reporting rule comprising a second reporting mode field which comprises delayed reporting;

updating the session with the session management function network element, generating usage amount information before rate switching, and transmitting the usage amount information before rate switching to the session management function network element, so that the session management function network element caches the usage amount information before rate switching; and continuously forwarding at least one packet until the reporting threshold is reached, generating usage amount information after rate switching, and transmitting the usage amount information after rate switching to the session management function network element.

11. A non-transitory computer-readable storage medium storing computer programs which, when executed by a processor, cause the processor to perform the traffic charging method of claim 4.

* * * * *